April 4, 1961 J. R. CHAPMAN, JR., ET AL 2,977,982
PRIORITY VALVE CONSTRUCTION
Filed Dec. 24, 1958
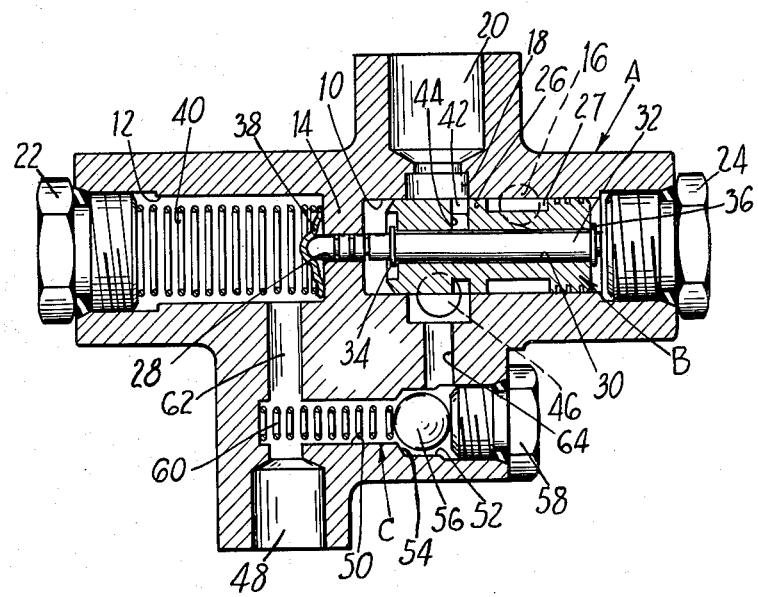
JAMES R. CHAPMAN JR.
JAMES O. BYERS JR.
INVENTORS
BY
William P. Hickey
ATTORNEY United States Patent Office 2,977,982
Patented Apr. 4, 1961

2,977,982

PRIORITY VALVE CONSTRUCTION

James R. Chapman, Jr., and James O. Byers, Jr., St. Joseph, Mich., assignors to The Bendix Corporation, a corporation of Delaware Filed Dec. 24, 1958, Ser. No. 782,869

4 Claims. (Cl. 137—612.1)

The present invention relates to a type of pressure actuated valve, and more particularly to a new and improved priority valve.

A principal object of the invention is the provision of a new and improved valve which will not communicate flow to an outlet port until the inlet pressure exceeds a generally predetermined level, and after said predetermined pressure level is exceeded, will pass flow to said outlet port with very little pressure drop, and whose construction is simple in design, rugged in its construction, and efficient in its operation.

The invention resides in certain constructions and combinations and arrangements of parts, and further objects of the invention will become apparent to those skilled in the art to which the invention relates from the following description of the preferred embodiment described with reference to the accompanying drawing forming a part of this specification.

The solitary figure of the drawing is a cross sectional view of a preferred construction of a priority valve. The valve generally comprises a valve body A having first and second axially aligned bores 10 and 12 respectively therein which are separated by an integral partition wall 14. The first bore 10 is provided with an outlet port 16 spaced from the partition 14 and a pressure inlet recess 18 positioned between the outlet port 16 and the partition 14, and to which recess 18 a pressure inlet port 20 opens. A suitable valve spool B is positioned in the first bore 10 to control flow between the pressure inlet port 20 and outlet port 16, and a pair of threaded plugs 22 and 24 are screwed into opposite ends of the bores 10 and 12 respectively to close off their ends. The valve spool B is provided with a land portion 26, which in the normal position of the spool closes off the recess 18 from the outlet port 16, and a recess 27 which is normally positioned over the outlet port 16 and which communicates the inlet port 20 and outlet port 16 when the spool B is moved towards the partition 14 from its normal position shown in the drawing.

The partition 14 is provided with an axially extending opening 28 between the bores 10 and 12, and the valve spool B likewise contains an axial opening 30 whose diameter is slightly larger than that of opening 28. A pin 32 extends through opening 28 and 30 to project into bore 12, and a pair of snap rings 34 and 36 are carried by pin 32 so as to loosely abut its opposite ends. A suitable spring retainer 38 is positioned in bore 12 over the end of pin 32, and a coil spring 40 is positioned between the retainer 38 and plug 22 to normally hold the retainer against the bottom of bore 12 and the valve spool B in its normal position shown in the drawing. The valve spool B is also provided with a recess 42 in its land 26, and with a radial bore 44 extending between recess 42 and longitudinal bore 30 to at all times communicate the pressure inlet port 20 to opposite ends of the valve spool B. A second outlet port 46 opens into the recess 18.

The preferred embodiment also includes a normally open flow valve C which normally conducts flow from the recess 18 to an exhaust or flow through port 48. The flow valve C is formed by a bore 50 in the housing A positioned generally parallel and to one side of the bores 10 and 12. The end of bore 50 opposite the bore 10 is counterbored as at 52 to provide a valve seat 54. A ball valve 56 is positioned in the counterbore 52, and the end of the counterbore 52 is closed off by a threaded plug 58. A coil spring 60 is positioned between the bottom of the bore 50 and ball 56 to normally hold it off of its seat, and a passageway 62 is provided in the housing A to continually communicate bore 12 with the flow through port 48.

When pressure fluid is first admitted to inlet port 20, flow is established through recess 18 to outlet port 46 and through interconnecting bore 64 to the side of ball valve 56 opposite from its seat 54. Ball 56 and bore 52 are proportioned such that flow around ball 56 creates a pressure drop sufficient to overcome spring 60 and bias the ball against its seat 54 when a predetermined flow is reached. Thereafter pressure builds up on opposite ends of spool valve B, until such time as sufficient pressure is reached on the area of the end of pin 32 to overcome spring 40. Thereupon, spring 40 yields to permit pin 32 and spool valve B to shift sufficiently for its recess 27 to communicate the pressure inlet port 20 with the outlet port 16 to allow flow to proceed from port 20 to port 16 without appreciable pressure drop.

It ordinarily happens that pump supply systems can only supply a predetermined rate of flow when developing a predetermined discharge pressure; and that whenever a demand greater than said predetermined rate is placed upon the supply pump, its discharge pressure falls below said predetermined pressure. If the combined demand of the systems connected to ports 16 and 46 exceeds said predetermined flow, the pressure in the inlet port 20 and hence on opposite ends of the spool valve B falls below said predetermined pressure. When this occurs, valve spool B shifts to produce a throttling action between ports 20 and 16. If the demand at port 46 exceeds the predetermined flow rate, the pressure in the valve falls below the predetermined pressure and the valve spool B shifts to completely close off port 16 from port 20. If the demand at port 46 does not exceed the predetermined flow rate, the valve spool B throttles flow to port 16 to the extent necessary to maintain said predetermined pressure at port 46.

While the invention has been described in considerable detail, I do not wish to be limited to the particular constructions shown and described; and it is my intention to cover hereby all novel adaptations, modifications and arrangements thereof which come within the practice of those skilled in the art to which the invention relates.

We claim:

1. A priority valve comprising: a valve body having first and second aligned bores and an integral partition wall separating said first and second bores, said body having a pressure inlet port and an outlet port opening into said first bore, a valve spool in said first bore, said valve spool having a normal position spaced from said partition and including a land which seals communication between said pressure inlet port and said pressure outlet port when said valve spool is in its normal position and a recess which communicates said inlet and outlet ports when said valve spool is moved to a second position relatively to said partition from its normal position, said partition having an opening therethrough, a pin projecting through said opening and slidable sealingly therein, a spring in said second bore operatively engaging said pin, means connecting said pin and valve spool whereby said spool is located by said spring in its normal position, and a through passage within said valve spool for communicating the pressure of said inlet port at the opposite end of said spool and acting over a differential area effective for displacing said valve spool from its normal position to its second position against the resistance of said spring whereby said inlet and outlet ports are communicated.

2. A priority valve comprising: a valve body having first and second bores and an integral partition wall separating said bores, a pressure inlet port and a pressure outlet port spaced along said first bore and opening therein, a valve spool in said first bore having a normal position which seals communication between said inlet and outlet ports, means defining a recess in said valve spool for communicating said inlet and outlet ports when said spool is moved from its normal position, a through passage in said partition and valve spool which are constructed to be in aligned relation, a pin extending through said passages to be in sealing and sliding relation with the through passages in said partition and proportioned relatively to the through passage in said valve body to permit fluid communication therein to opposite ends of said valve spool, a radial bore communicating fluid pressure from said inlet port to the through passage in said valve spool, spring means in said second bore operatively abutting said pin, and means connecting said pin with said valve spool whereby the force of said spring is effective to locate said valve spool in its normal position.

3. A priority valve comprising: a valve body having first and second aligned bores and an integral partition wall separating said bores, said body including a pressure inlet port and an outlet port spaced along and opening into said first bore, a valve spool in said first bore having a normal position and an inner land which seals communication between said inlet and outlet ports when said valve spool is in its normal position, means defining a recess in said valve spool to communicate said inlet and outlet ports when said valve spool is moved from its normal position, aligned passages in said partition and spool, a pin extending slidably and sealingly through the passage in said partition and through the passage in said valve spool, said pin being proportioned whereby fluid passage is permitted through the space in the through passage of said valve spool unfilled by said pin, means connecting said pin with said spool, spring means disposed in said second bore and operatively connected to said pin to locate said spool in its normal position, said spool being positioned to communicate said inlet and outlet ports when said valve spool is moved from its normal position against the resistance of said spring by the fluid pressure transmitted by way of the through passage of said spool and acting over the differential effective area at the ends of said spool.

4. A priority valve comprising: a valve body having first and second aligned bores and an integral partition wall separating said bores, a pressure inlet port and a pressure outlet port spaced along and opening into said first bore, a valve spool slidably received in said first bore, said valve spool including an inner land which seals off said pressure inlet port and outlet port when said valve spool is in its normal position and a recess which communicates said inlet and outlet ports when said spool is moved from its normal position, aligned passages in said partition and spool, a pin extending through said passages to be in sliding and sealing engagement with the passage in said partition and proportioned relatively to the through passage in said spool to provide a remaining area effective for communicating fluid pressure therethrough to the ends of said valve spool, a bore communicating the through passage of said valve spool with said inlet port, spring means in said second bore operatively engaging said pin and acting therethrough to locate said valve spool in its normal position, a bore in said valve body disposed generally parallel to said first and second bores and having a counter bore in its end providing a valve seat, a ball valve in said counter bore adapted to close off said valve seat, spring means biasing said ball valve away from its seat, means communicating said inlet port to said counter bore on the side of said ball valve oppositely from said valve seat, and an exhaust port communicating said second bore and the small diameter end of said parallel bore.

References Cited in the file of this patent

UNITED STATES PATENTS 2,411,258    Galloway  ---------------- Nov. 19, 1946

FOREIGN PATENTS 282,488    Great Britain ---------------- of 1927